United States Patent
Hosaka et al.

(10) Patent No.: US 7,759,005 B2
(45) Date of Patent: Jul. 20, 2010

(54) BIPOLAR BATTERY AND VEHICLE THAT CONTAINS THE BATTERIES

(75) Inventors: Kenji Hosaka, Yokosuka (JP); Ryouichi Senbokuya, Yokosuka (JP); Osamu Shimamura, Yokohama (JP); Naoto Kiriu, Yokosuka (JP); Hideaki Horie, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 873 days.

(21) Appl. No.: 11/484,023

(22) Filed: Jul. 10, 2006

(65) Prior Publication Data

US 2007/0015047 A1    Jan. 18, 2007

(30) Foreign Application Priority Data

Jul. 12, 2005    (JP)    ............................. 2005-203723

(51) Int. Cl.
    *H01M 6/48*    (2006.01)
(52) U.S. Cl. ........................ 429/210; 429/185; 429/186; 429/231.8
(58) Field of Classification Search ................... 429/210
    See application file for complete search history.

(56) References Cited

U.S. PATENT DOCUMENTS

| 2002/0045089 | A1* | 4/2002 | Kawahara et al. | ............. 429/44 |
| 2003/0054244 | A1 | 3/2003 | Fredriksson et al. | |
| 2003/0194605 | A1* | 10/2003 | Fauteux et al. | ............. 429/149 |
| 2004/0072078 | A1* | 4/2004 | Fukuzawa et al. | ........... 429/233 |
| 2004/0161667 | A1* | 8/2004 | Fukuzawa et al. | ........... 429/210 |

FOREIGN PATENT DOCUMENTS

| JP | 11-204136 | 7/1999 |
| WO | 03/096441 A2 | 11/2003 |

* cited by examiner

*Primary Examiner*—Dah-Wei D Yuan
*Assistant Examiner*—Patricia Davis
(74) *Attorney, Agent, or Firm*—Young Basile (57) ABSTRACT

The disclosure is directed to a bipolar battery that is constructed to improve battery performance by reducing distortions within electrode material of the bipolar battery. The bipolar battery includes multiple battery elements that each includes multiple unit batteries. Each unit battery contains a conductor having a positive electrode layer and a negative electrode layer. A collector is positioned between adjacent positive and negative electrode layers of adjacent unit batteries, and an accumulated thickness absorption member is used to separate collectors of adjacent battery elements. The bipolar battery may be used in a motor vehicle, such as an electric car.

12 Claims, 9 Drawing Sheets

BIPOLAR BATTERY AND VEHICLE THAT CONTAINS THE BATTERIES

This application claims priority to Japanese Patent Application No. 2005-203723, filed Jul. 12, 2005, the entire content of which is incorporated herein by reference.

TECHNICAL FIELD

The invention relates to batteries, and more specifically, bipolar batteries.

BACKGROUND

The bipolar battery is a battery that forms a positive electrode layer on one surface of a collector and a negative electrode layer on another surface. These surfaces are arranged in an alternating fashion with an electrolyte layer that performs ion replacement between each bipolar electrode. If the companions between the electrodes at the ends of this kind of bipolar battery come in contact, there is a short circuit, and in addition, if the electrolyte layers come into contact, a liquid junction would be formed.

To counteract these problems, some bipolar batteries utilize a coating of an insulating material on the periphery of a unit battery formed by sandwiching the separator that has been immersed in an electrolyte between the positive and negative electrodes. In addition, the periphery of the unit battery is formed by laminating using a conducting foil to prevent a liquid junction or short circuit between each electrode.

SUMMARY

In general, embodiments of the invention are directed to a bipolar battery that reduces thickness distortions to prevent degradation in battery performance. With an increase in the number of laminations of the bipolar battery, as known in conventional batteries, there may be distortions generated from defects in the thicknesses of the electrode material that may reduce the battery's performance. Consequently, problems occur that reduce the manufacturing yield from the addition of lamination layers.

An embodiment of the invention may provide a solution to conventional technical problems with bipolar batteries by preventing the occurrence of distortions from defects of the thicknesses of the electrode members and the reduction in the battery's performance due to this distortion. Provided herein is a description of a bipolar battery that may improve the manufacturing yield, along with a battery pack and a vehicle which contains these batteries.

In one embodiment, the invention provides a bipolar battery that includes a plurality of sub battery elements. Each sub battery element includes a plurality of collectors that are arranged in an alternating fashion with a conductor that performs ion exchange between a positive electrode layer formed on one surface of the collector and the negative electrode layer formed on the other surface of the collector. An accumulated thickness absorption member is arranged between the sub battery elements.

In another embodiment, the invention provides a bipolar battery that includes a plurality of sub battery elements, where each sub battery element includes a plurality of collectors that comprise a positive electrode layer on one surface and a negative electrode layer on another surface and a conductor disposed between the collectors, wherein the conductor performs ion exchange between the positive electrode layer formed on the one collector and the negative electrode layer formed on the other collector. The bipolar battery also includes means for absorbing thickness changes that is arranged between the collector of the one sub battery element and the collector of the other sub battery element.

In an alternative embodiment, the invention provides a method for manufacturing a bipolar battery that includes forming two or more sub battery elements by stacking two or more unit batteries for each of the battery elements, wherein each unit battery is constructed by forming a positive electrode layer on one surface of a collector and a negative electrode layer on another surface of the collector, and forming a conductor by laminating an electrode layer that performs ion exchange between a positive electrode layer and a negative electrode layer, wherein the positive electrode layer is disposed on an opposite side of the conductor to the negative electrode layer. Each unit battery may also be formed by forming a seal layer on a periphery of the electrolyte layer to prevent electrolyte leakage. The bipolar battery is also manufactured by positioning an accumulation thickness absorption member between the collector of a first sub battery element and the collector of a second sub battery element.

The details of one or more embodiments of the invention are set forth in the accompanying drawings and the description below. Other features, objects, and advantages of the invention will be apparent from the description and drawings, and from the claims.

DETAILED DESCRIPTION

Provided herein is a detailed explanation of the implementation of a bipolar battery, a battery pack and a vehicle which contains these batteries that are related to this invention and based on the drawings. Moreover, the drawings utilized to illustrate the below implementation are drawn by exaggerating the thickness or form of each layer for easy understanding of the contents of the invention and are not representative of adjustments made for the thickness or form of every layer of an actual bipolar battery.

Figure 1:
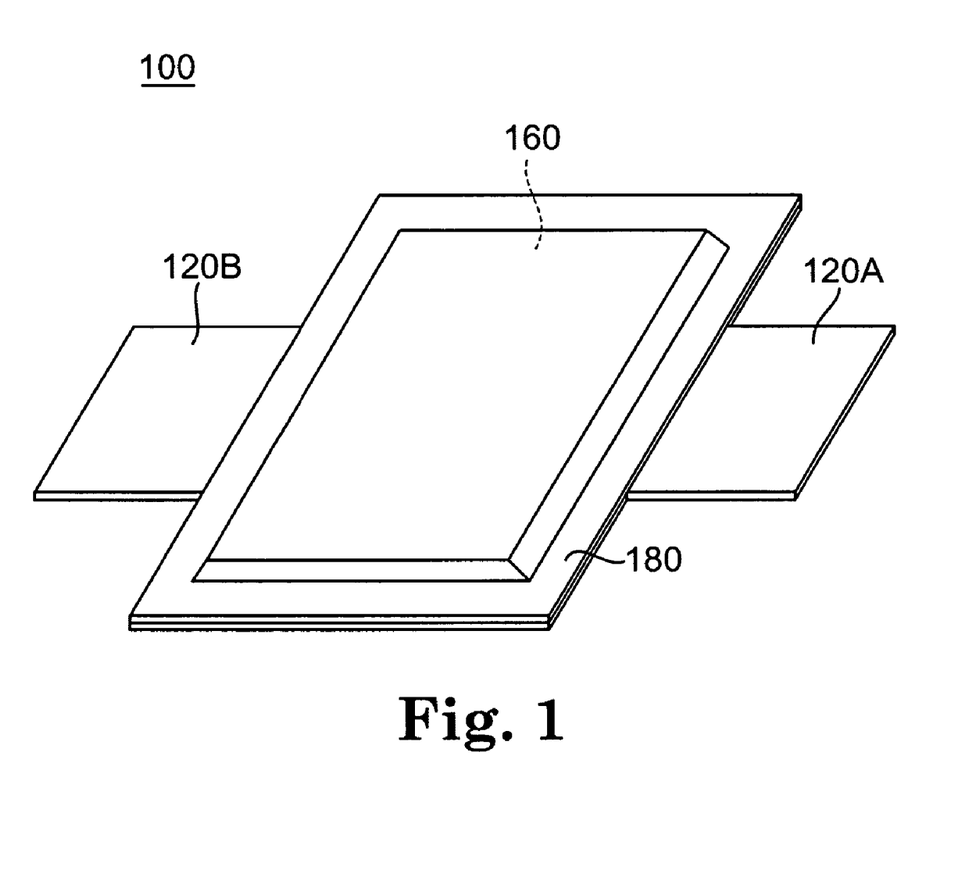
FIG. 1 is a perspective view of the bipolar battery related to one embodiment.

FIG. 1 is an external view of a bipolar battery that is related to this implementation. The bipolar battery 100 as a longitudinal flat shape as shown in FIG. 1, and from both sides the positive electrode tab 120A and the negative electrode tab 120B are taken out in order to draw power. The bipolar battery element 160 is wrapped according to an external member 180 of the bipolar battery 100, and its periphery is then used, and the bipolar battery element 160 is sealed under conditions whereby the positive electrode tab 120A and the negative electrode tab 120B are pulled out.

Figure 2:
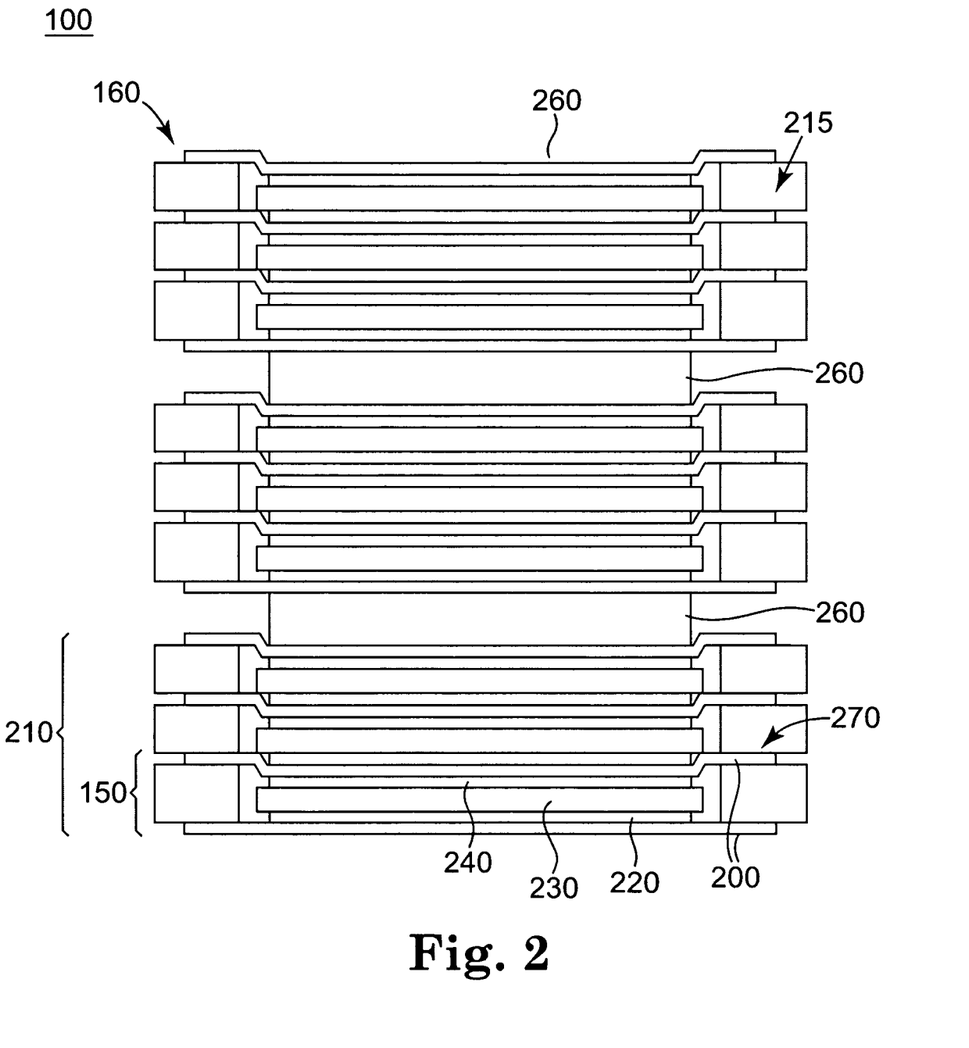
FIG. 2 is a side internal view of the structure of a bipolar battery related to an embodiment.

FIG. 2 is an internal side view of a bipolar battery 100 related to this embodiment. The bipolar battery element 160, or sub battery, and the bipolar battery 100 are formed as follows. First, bipolar electrodes 270 are prepared in which a positive electrode layer 240 is formed on one surface of a collector 200 and a negative electrode layer 220 is formed on the other surface. Between these bipolar electrodes 270, there is formed a single battery 150 by establishing the electrolyte layer 230, e.g., a conductor or means for performing ion exchange, in order to perform ion exchange between the bipolar electrodes 270. The collector provides means for connecting the positive electrode layer and the negative electrode layer of adjacent unit batteries, e.g., single battery 150. There is formed a sub bipolar battery element 210 by superimposing three simple unit batteries 150 and coating, using a sealing (or seal) member 215, the periphery of the sub bipolar battery element 210. Furthermore, there is a three layer superposition of the sub bipolar battery element 210 by means of the accumulated thickness absorption member 260, or means for absorbing thickness changes. Therefore, bipolar battery element 160 is formed.

The collector 200 of the lowest, e.g. bottom most, layer of the bipolar battery element 160 of the bipolar battery element connects with the negative electrode tab 120B, and the top layer of the collector 200 connects with the positive electrode tab 120A. For the bipolar battery element 160 shown in FIG. 2, the sub bipolar battery element 210, which is assumed to be one group of three unit batteries 150, is three groups in serial contact. Thus, between the positive tab 120A and the negative tab 120B, nine times the voltage of the unit battery 150 is produced.

If the accumulated thickness absorption member 260 has absorbable thickness or form such that there are distortions between the sub bipolar battery elements 210, construction may not use this kind of material. In addition, it is preferable that the lamination does not to reduce the battery's performance from the count of the laminations of the sub bipolar battery elements 210 and from changes that would affect the thickness or characteristics of each member used to form the unit battery 150. Moreover, in this implementation, sub bipolar battery elements 210 are formed as one group of three unit batteries 150, and there is alternate lamination of the sub bipolar battery element 210 groups by means of the accumulated thickness absorption member 260. The lamination count of the unit battery 150, which forms a sub bipolar battery element 210, in the lamination count of the sub bipolar battery element 210, which forms the bipolar battery element 160, is not limited to this implementation. In addition, the positive electrode layer or the negative electrode layer of the bipolar electrode 270 that is facing the accumulated thickness absorption member 260 in FIG. 2 is omitted in order to reduce the parts used in the manufacturing process. It is permissible to use this as the bipolar electrode 270 that forms the positive electrode layer or the negative electrode layer.

That is, by establishing an accumulated thickness absorption member 260 between adjacent sub bipolar battery elements 210, the accumulated thickness absorption member 260 prevents a reduction in battery performance by absorbing the distortion of each sub bipolar battery element 210. In addition, because each sub bipolar battery element 210 is formed as one group, it is possible to remove a defective sub bipolar battery element 210 through investigations by initially charging each of the sub bipolar battery elements 210. This makes possible a dramatic improvement in manufacturing yield.

Figure 3A:
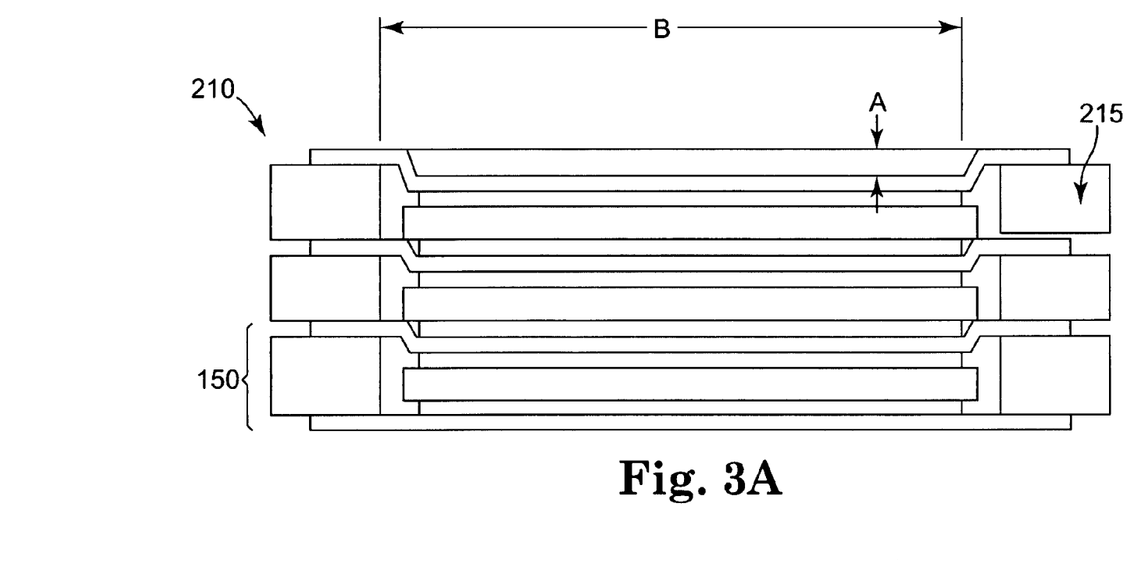
FIGS. 3A and 3B are diagrams showing the relationship of the size and accumulated error difference in size of the external material categorizing the size and thickness of the accumulated thickness absorption member.
Figure 3B:
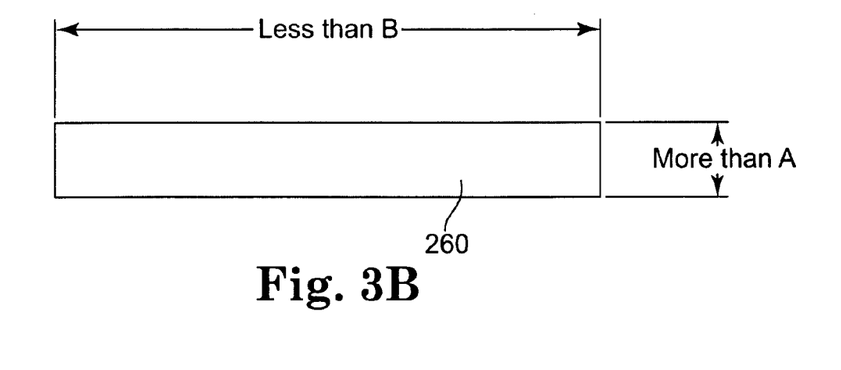

FIGS. 3A and 3B characterize the thickness and size of the accumulated thickness absorption member 260 using the relationship of the size and accumulated error inside the seal member 215. As shown in the diagram, the bipolar battery element 210 is coated by a seal member 215.

The electrolyte liquid for the electrolyte layer 230 makes contact with electrodes at different voltages. The seal member 215 is established in order to prevent the occurrence of liquid juncture by contact and is arranged to surround the periphery of the electrolyte layer 230. More specifically, sealing above and below the collector 200 sandwiches the electrolyte layer 230 to prevent exuding of the electrolyte. These seal members 215 may use one or more of heat fused film (PE), heat hardened resins (epoxy) and optically hardened resins.

The accumulated error A, which is generated when laminating the unit batteries 150, is from the formation of the seal member 215. Accumulated error A is generated by defects in the thickness of the seal member 215 and the thickness between the layers. It may be preferable to make uniform the thickness of the seal member 215 and the thickness between the layers, but uniformity is difficult during manufacturing processes. Especially when considering the formation of the seal member 215 and the collector 200, it is necessary to have a thickness compared to the thickness between the electrodes before the process of heat fusion or heat hardening for the seal member 215, and it is desirable to perform the sealing process under pressure with these conditions. From the results, making the thickness of the seal member 215 thin is difficult, and distortions are generated due to this difficulty.

The accumulated thickness absorption member 260 is formed so as to be small compared to the size B of the part that faces inside the battery element within the seal member 215, as shown in FIG. 3. It is desirable that the thickness be at least as large the accumulated error A. With the formation in this way, the size of the accumulated thickness absorption member 260 is larger than the size of the part that faces the battery element inside of the seal member. If the thickness of the accumulated thickness absorption member 260 is greater than the accumulated error A, it is because there was no absorption of the distortion that was generated at every sub bipolar battery element 210. Moreover, in this implementation, it is possible for the accumulated error A to have a value that deducts the overall thickness between the layers from the overall thickness of the seal member 215 coating the sub bipolar battery element 210.

In this way, by forming the size of the accumulated thickness absorption member 260 smaller than the size of the part that faces inside the battery elements within the seal member 215, and by forming the thickness of the accumulated thickness absorption member 260 thicker than the accumulated error A, because it is possible to absorb the distortion that is generated for every sub bipolar battery element 210, there is no reduction in the battery's performance.

Figure 4:
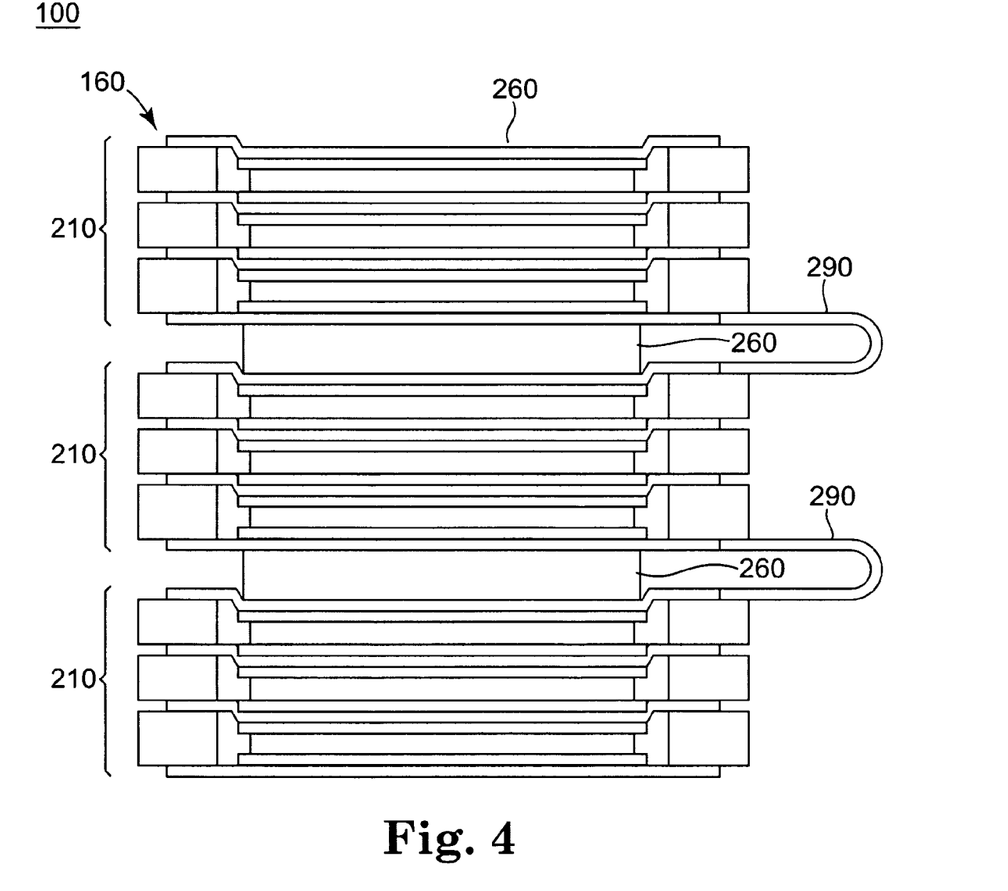
FIG. 4 is a internal side view of the structure of a bipolar battery with material that does not have conductivity of the accumulated thickness absorption member for Embodiments 1 to 3.

FIG. 4 is an internal side view of a bipolar battery 100 related to this implementation, and there is adopted material that has no conductance as the accumulated thickness absorption member 260. By adopting this kind of structure, there is sufficient absorption of the distortions of each sub bipolar battery element 210. Because there is interposed an accumulated thickness absorption member 260 that does not have conductance in between adjacent bipolar battery elements 210, conductance between the sub bipolar battery elements 210 is not possible, and it is necessary to connect adjacent sub bipolar battery elements 210 by a lead 290.

Figure 5:
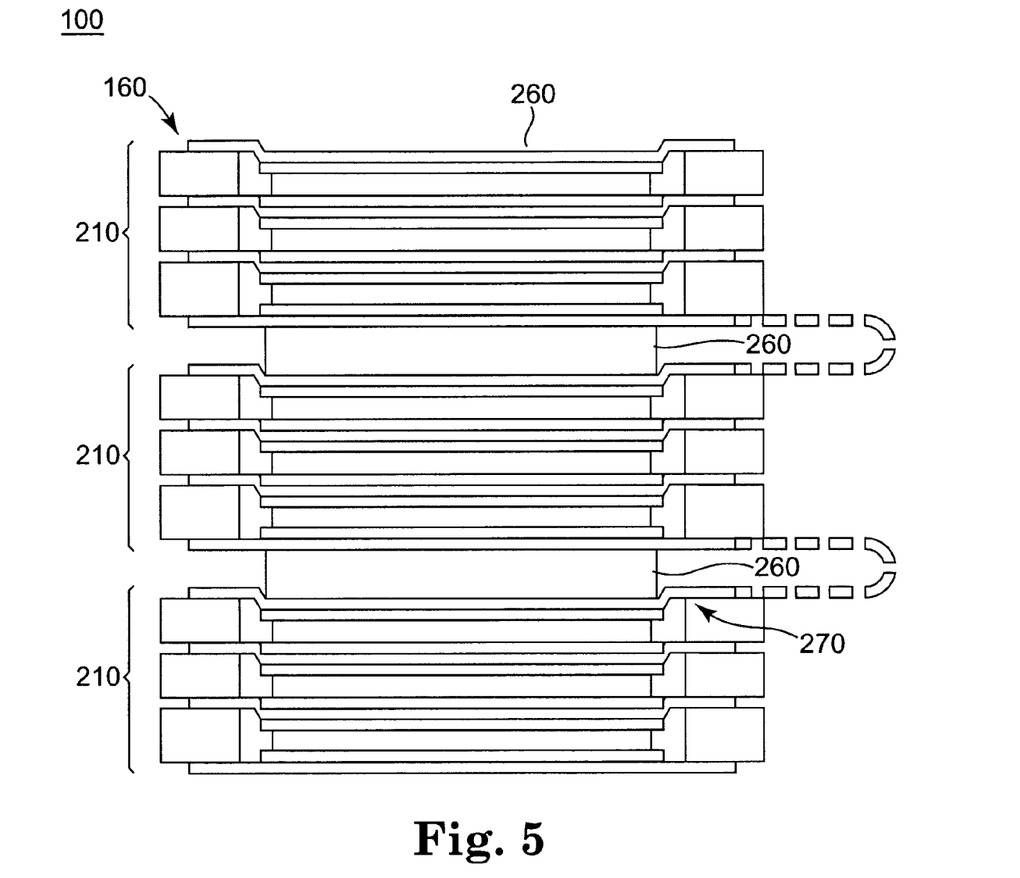
FIG. 5 is a internal side view of the structure of a bipolar battery with material that does have conductivity of the accumulated thickness absorption member for Embodiments 4 to 6.

With respect to this, in FIG. 5, there is adopted material that has conductance as the accumulated thickness absorption member 260. Because material that has conductance is used here, resistance is high to a flow of electrons in the lamination direction (thickness direction), and there can be no construction even using the material. However, considering the conductivity of the bipolar electrode 270, the flatness of the contact surface is high, and in addition it is desirable to select material with a low Young's modulus. For example there has been cited Cu, Al, Au, Ag, carbon and conductive polymers.

By forming in this way the accumulation thickness absorption member 260 using conductive material, while distorting the distortion for each sub bipolar battery element 210, conduction becomes possible between adjacent sub bipolar battery elements 210. As shown by the dashed line in FIG. 5, leads 290 shown in FIG. 4 are unnecessary and are not used. In addition, it becomes possible to connect in a surface direction, and it becomes possible to design for low resistivity in the battery.

Figure 6:
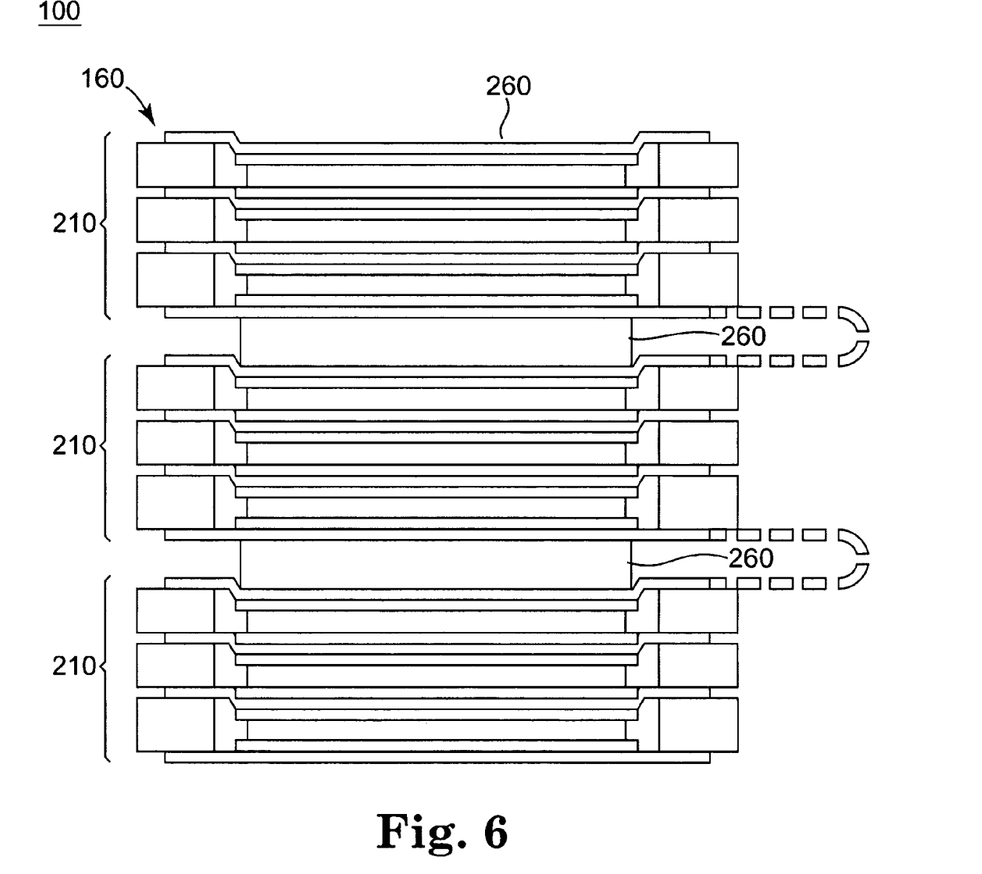
FIG. 6 is a internal side view of the structure of a bipolar battery when a fibrous carbon sheet has been adopted as the accumulated fitness absorption member for Embodiments 7 and 8.

FIG. 6 is an internal side view of a bipolar battery 100 where there has been adopted a fibrous carbon material as the accumulated thickness absorption member 260. When forming the accumulated thickness absorption material 260 using a sheet-shaped fibrous carbon material, it is possible to establish a low Young's modulus from the characteristics of the fibrous material. In addition, because there is carbon material even in the fibrous material, it becomes possible to conduct between adjacent sub bipolar battery elements 210, and the use of leads (leads 290 as shown in FIG. 4) is not necessary.

Figure 7:
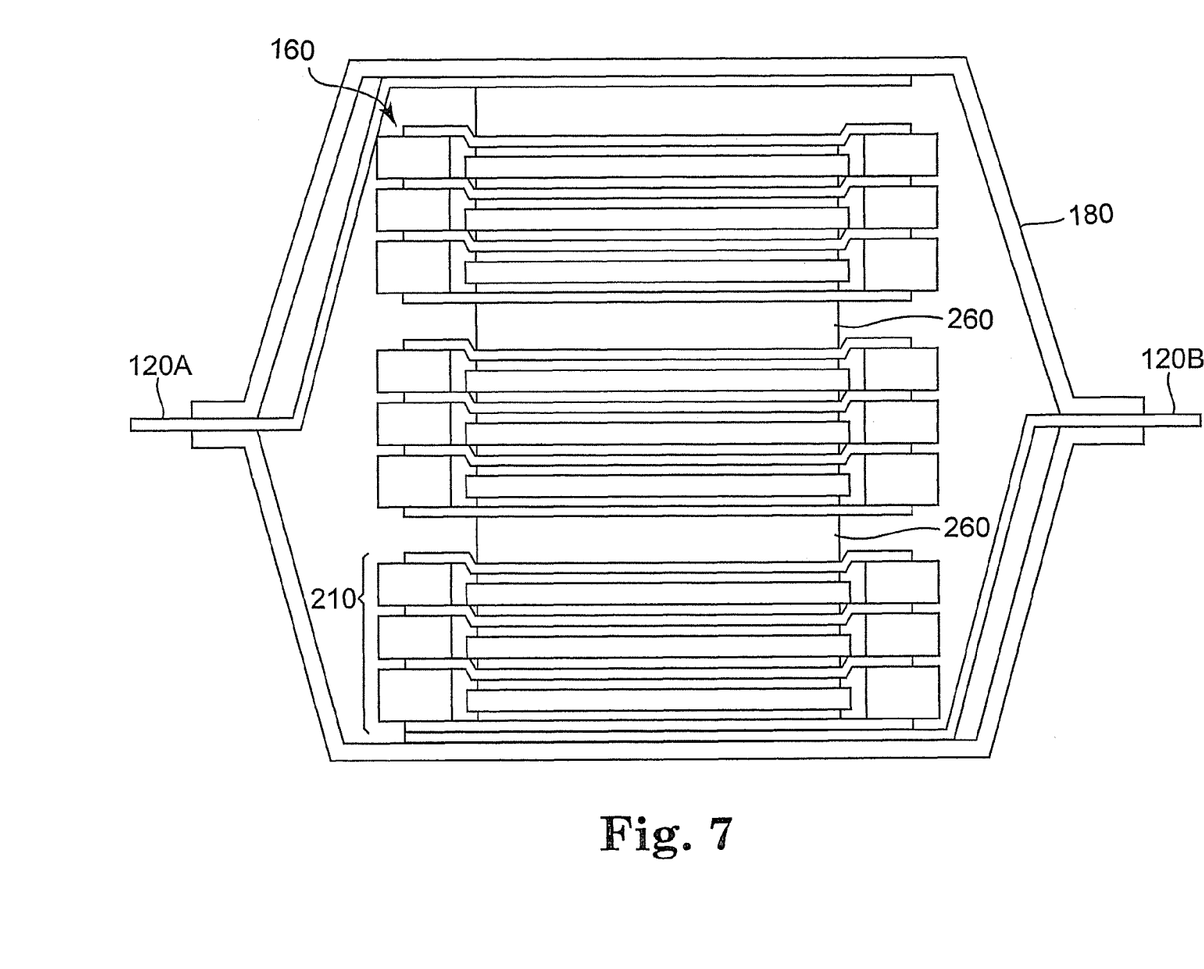
FIG. 7 is a internal side view of a bipolar battery related to an embodiment.

FIG. 7 is an internal side view of the bipolar battery 100 for this implementation. Is shown in the diagram, there is coating using external material 180 (outer case) for which the bipolar battery element 160, which contains three groups of sub bipolar battery elements 210, has flexibility. The periphery is heat fused, and as was previously described, the bipolar battery element 160 is sealed such that the electrode tab 120A and the electrode tab 120B are pulled out. Moreover, for the accumulated thickness absorption member 260 there is adopted a fibrous carbon sheet.

The internal pressure of the external material 180 is lower than atmospheric pressure, e.g., a vacuum. That is, there is additional pressure on the bipolar battery elements 160 in the lamination direction by hydrostatic pressure, which used atmospheric pressure during formation as the internal pressure of the external material 180. With the addition of a magnetic force from a magnet, and by imparting hydrostatic pressure, and by making use of the current of the unit batteries 150 that are serially connected within the bipolar battery element 160 of the entire surface of the electrode using strong electrical terminals, it is possible to counter variations in the current density distribution.

By using material that has flexibility as formation material for the external material 180, the material 180 is not destroyed by pressure differences between the inside and the outside and can easily deform. The material that forms the external material 180 displays electrical insulation by not being permeable to oxygen, electrons, light or gases. With electrolytes inside and chemically stable, it is permissible to use this kind of material, such as polyethylene, polypropylene or polycarbonate as synthetic resins. If considering a reduction in possible air contact for heat fusing of the external material 180 or the electrolytes, it is desirable to select a laminated film that coats using a synthetic resin metal foil, such as aluminum.

When a laminate film is used that is comprised of metal foil and synthetic resin membranes as the external material 180, it becomes possible to have hydrostatic pressure because of the easy deformation of the resin film. Furthermore, because of the existence of the metal foil there is a reduction is gas permeability, thus making possible on a long-term basis the maintenance of a pressure difference between the inside and the outside of the external material 180.

In addition, it is desirable that the electrolyte layer 230 be formed from solid-type electrolytes. By using solid electrolytes as the electrolyte layer 230, it becomes possible to prevent leaks. In addition, it is possible to prevent liquid junctions, which are characteristic problems for electrode secondary batteries. Therefore, it becomes possible to realize bipolar batteries with high reliability.

The following includes an explanation based on the differences between completely solid macromolecular electrolytes and macromolecular gel electrolytes. There are completely solid macromolecular electrolytes such as PEO (polyethylene oxide) and macromolecular gel electrolytes included in electrolytes that are used for lithium ion batteries. In addition, as with PVDF, PAN and PMMA, within the skeleton of the macromolecule that does not conduct lithium ions, there is correspondence with macromolecular gel electrolytes that maintain electrolytic solutions. The proportions of the polymer that form the macromolecular gel electrolytes and electrolytic solutions varies widely. Assuming a polymer as 100% for the completely solid macromolecular electrolyte and assuming the liquid electrolyte is 100% electrolytic solution, the intermediate body is the macromolecular gel electrolyte. In addition, the completely solid type electrolyte corresponds with all of the electrolytes that conduct Li ions such as macromolecules or inorganic solids. In this invention, when one speaks of a solid-type electrolyte, it is assumed to include all macromolecular gel electrolytes, completely solid macromolecular electrolytes and inorganic solid electrolytes.

Furthermore, the active material of the positive electrode layer 240 uses a lithium transition metal complex oxidized material. It is desirable to use for the active material of the negative electrode layer 220 a carbon or lithium transition metal complex material. From these uses, it is possible to realize a bipolar battery that has excellent capacity and output characteristics.

Figure 8A:
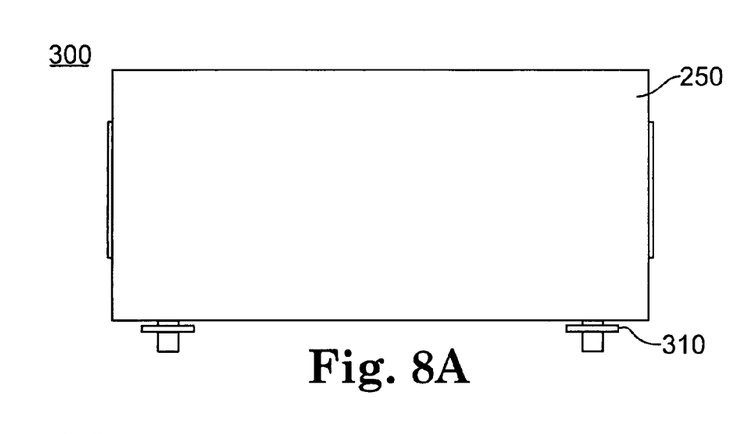
FIGS. 8A-8C are external views of a battery pack.
Figure 8B:
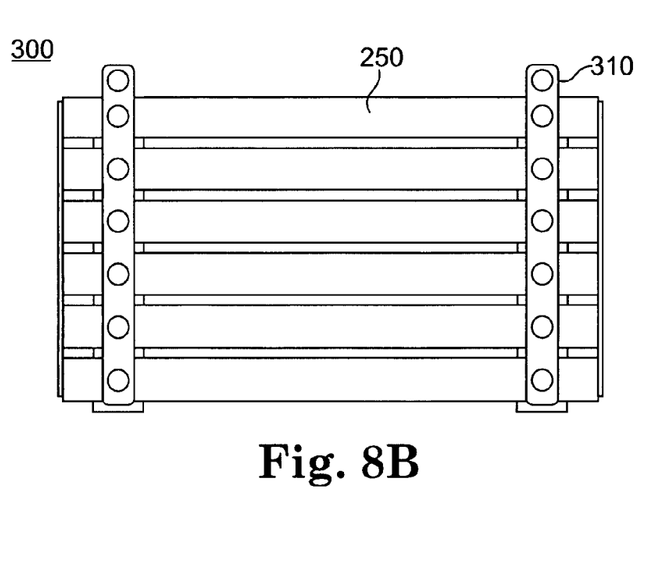
Figure 8C:
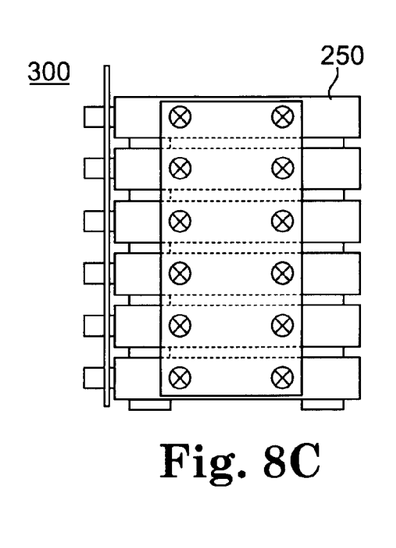

The above explained bipolar battery may be used to form a battery pack module 250 (FIGS. 8A-8C) by connecting serially or in parallel a plurality of such batteries, and it is possible to form a battery pack 300 by connecting serially or in parallel a plurality of battery pack modules 250. Battery pack module 250 may include one or more bipolar batteries. FIG. 8A shows a flat surface view, FIG. 8B shows a front view, and FIG. 8C shows a side view of the battery pack 300. Each battery pack module 250 mutually connects by using electrical connection means such as a bus bar, and the battery pack module 250 operates as multiple stages of lamination by using the connection jig 310. There is formed a battery pack module 250 by connecting some bipolar batteries 100, and in addition, there is formation of the battery pack 300 by laminating some stages of the battery pack module 250, a number of which may be determined to correspond to the battery capacity and output of a vehicle that contains these batteries, e.g., an electrical car.

In this way, it is possible to obtain a battery pack 300 that is formed by connecting in parallel or serially a plurality of battery pack modules 250 so as to be able to obtain high-capacity and high output. Because reliability is high for the battery pack modules 250 separately, there is a possibility of maintaining long-term reliability for the battery pack 300. In addition, even if one of the battery pack modules 250 breaks down, it is possible to repair by exchanging only the nonfunctional part.

Figure 9:
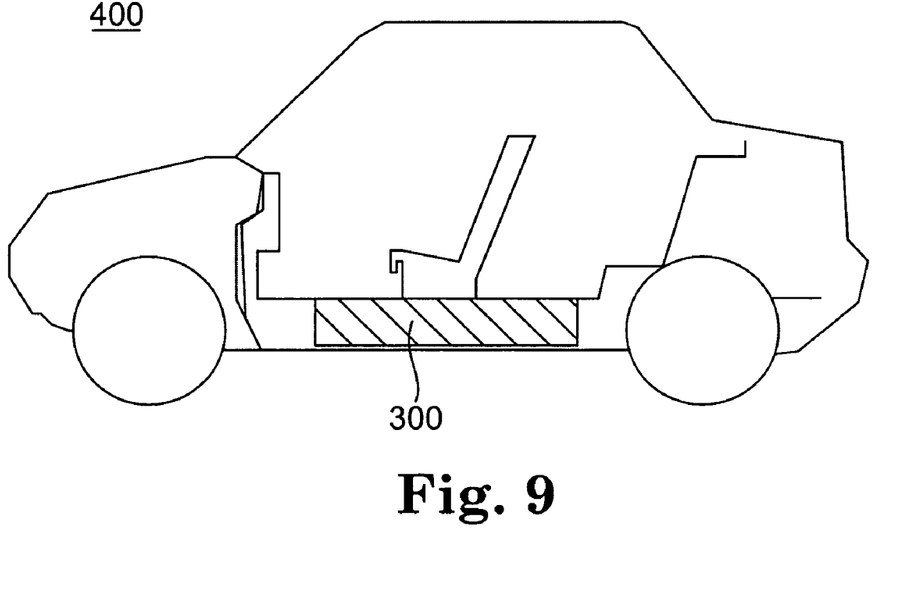
FIG. 9 is an illustration which shows the conditions under which the battery pack is contained in a vehicle.

In an electric car 400 which contains the battery pack 300, as shown in FIG. 9, the battery pack is stored, or mounted, under the seat in the center of the electric car 400. When contained under the seat, there is the possibility of expanding space within the car and in the trunk room. Battery pack 300 may be stored at other locations within car 400 in other embodiments. Moreover, the location that contains the battery pack 300 is not limited to under the seat, and may be under the rear trunk room and also in the engine space at the front of the car. The electrical car 400 that uses this kind of battery pack 300 has high durability, and the battery pack 300 provides sufficient output for long-term use. Furthermore, there is provided an electrical car which is superior in running ability and a hybrid car. In other embodiments, electric car 400 may be any type of motor vehicle, e.g., a truck, a bus or a van.

Moreover, not only is the battery pack 300 useful in applications, it may contain only the battery pack module 250, and it may contain combinations of these battery packs 300 and battery pack modules 250. In addition, the vehicles that can contain this invention's battery pack or battery pack modules are preferably the above-mentioned electrical or hybrid cars, but the invention is not limited to these. For example the invention is appropriate for other types of electrical cars.

Below, there is an explanation of embodiments of the bipolar battery that are related to this invention, but this invention is not limited to these embodiments.

Initially there is an explanation for the manufacture of the above-mentioned generating element (that is, sub bipolar battery element) 210, which is common to Embodiments 1 through 8. As explained above, the generating element 210 results from a multiple lamination alternately of bipolar electrodes 270, each of which is formed by a positive electrode layer 240 formed on one surface of a collector 200 and a negative electrode layer 220 formed on the other surface, and an electrolyte layer 230 that performs ion exchange between the bipolar electrodes 270. There is lamination of a plurality of unit batteries 150.

To form an electrode, there first is coating of electrode slurry on one surface of a stainless steel foil (SUS foil), which is a collector of thickness 20 μm, and then drying, with the formation of a positive electrode layer of membrane thickness 15 μm. The positive electrode slurry is 85 wt. % $LiMNO_2$ as the positive electrode active substance, 5 wt. % acetylene black as a conductive auxiliary, 10 wt. % of PVDF as binder and a mixture of NMP as slurry viscosity adjustment solvent.

Next, there is coating and drying of the negative electrode slurry on the opposite surface of the collector from the positive electrode layer, and formation of a negative electrode layer of membrane thickness 15 μm. The negative electrode slurry is 90 wt. % hard carbon as negative electrode active substance, 10 wt. % PCDF as binder and NMP as a slurry viscosity adjustment solvent.

By respectively forming the positive electrode layer and the negative electrode layer on both surfaces of the collector (SUS foil), there is formed a bipolar electrode (both polarity type of electrodes). The completed bipolar electrode is cut into a 190 mm×90 mm piece. In addition, because the outer peripheral 10 mm part forms a seal layer, the electrode part is limited. Moreover, there is coating of a positive electrode layer or a negative electrode layer on only one surface for the positive electrode terminal polarity and the negative electrode polarity.

By immersing the separator of polyethylene manufacture (thickness 12 μm), there is obtained a precursor by irradiating for 15 minutes ultraviolet rays into the quartz glass substrate. A pre-gel is comprised of a monomer solution (polyethylene oxide and polypropylene oxide copolymer) 3 wt. % of average molecular weight between 7500 and 9000, which is a precursor of the ion conduction macromolecular matrix, 97 wt. % of PC+EC (1:1) as an electrolytic solution, and 1.5M $LiBF_4$, and polymer initiator (BDK).

Battery elements are formed by laminating the positive electrode and a negative electrode that are facing one another with the insertion of the electrolyte; therefore, there is formation of the unit battery. By repeating this process, there is formed a battery element so that there are three layers of the unit battery that are laminated. By coating this battery element with a seal member, and first heat fusing 3 times, there is sealed the electrolyte layer in a vacuum seal of the battery element from the vacuum sealing of a final side.

The battery element has a seal member thickness for a single layer of 62 μm, and the thickness between layers, which is the sum total of the electrode and the separator, is 44 μm. The accumulated error for the unit layer is 62 μm−44 μm=18 μm. Because there have been superimposed three layers of the battery element, the accumulated error becomes 54 μm.

The accumulated error can be measured by subtracting the actual measured value of the thickness of the electrode part from the actual measured value of the thickness of the seal part. The accumulated error actual value of the battery element that was manufactured in this way is 56 μm.

Below, there is an explanation for Embodiments 1 to 8 and a comparative example. Embodiment 1 includes one group being the battery elements of 3 layers with a manufactured accumulated error of 56 μm as mentioned above, insert an accumulated error absorption member comprised of PET film of thickness 50 μm, and laminate 3 groups alternately as shown in FIG. 4. This manufactured 9 generating elements that have the accumulated error absorption member. In addition, the part is insulated by the accumulation error absorption member and electrically conducts by connecting a lead. Afterwards, there is welding of the tab that is used to draw current for the positive electrode terminal and the negative electrode terminal, manufacturing a bipolar battery that retains using a clip through insertion at the glass plate.

Embodiment 2 is now described. Let one group be the battery elements of 3 layers with a manufactured accumulated error of 57 μm as mentioned above, insert an accumulated absorption member comprised of PET film of thickness 57 μm, and laminate 3 groups alternately as shown in FIG. 4. This manufactures 9 generating elements that have the accumulated error absorption member. In addition, the part is insulated by the accumulated error absorption member and electrically conducts by connecting a lead. Afterwards, there is welding of the tab that is used to draw current for the positive electrode terminal and the negative electrode terminal, manufacturing a bipolar battery that retains using a clip through insertion at the glass plate.

Embodiment 3 is now described. Let one group be the battery elements of 3 layers with a manufactured accumulated error of 56 μm as mentioned above, insert an accumulated error absorption member comprised of PET film of thickness 60 μm, and laminate 3 groups alternately as shown in FIG. 4. This manufactures 9 generating elements that have the accumulated error absorption member. In addition, the part is insulated by the accumulation error absorption member and electrically conducts by connecting a lead. Afterwards, there is welding of the tab that is used to draw current for the positive electrode terminal and the negative electrode terminal, manufacturing a bipolar battery that retains using a clip through insertion at the glass plate.

Embodiment 4 is now described. Let one group be the battery elements of 3 layers with a manufactured accumulated error of 56 µm as mentioned above, insert an accumulated error absorption member comprised of metal foil of thickness 60 µm, and laminate 3 groups alternately as shown in FIG. 5. This manufactures 9 generating elements that have the accumulated error absorption member. Afterwards, there is welding of the tab that is used to draw current for the positive electrode terminal and the negative electrode terminal, manufacturing a bipolar battery that retains using a clip through insertion at the glass plate.

Embodiment 5 is now described. Let one group be the battery elements of 3 layers with a manufactured accumulated error of 56 µm as mentioned above, insert an accumulated error absorption member comprised of carbon plate of thickness 60 µm, and laminate 3 groups alternately as shown in FIG. 5. This manufactures 9 generating elements that have the accumulated error absorption member. Afterwards, there is welding of the tab that is used to draw current for the positive electrode terminal and the negative electrode terminal, manufacturing a bipolar battery that retains using a clip through insertion at the glass plate.

Embodiment 6 is now described. Let one group be the battery elements of 3 layers with a manufactured accumulated error of 56 µm as mentioned above, insert an accumulated error absorption member comprised of aluminum foil of thickness 60 µm, and laminate 3 groups alternately as shown in FIG. 5. This manufactures 9 generating elements that have the accumulated error absorption member. Afterwards, there is welding of the tab that is used to draw current for the positive electrode terminal and the negative electrode terminal, manufacturing a bipolar battery that retains using a clip through insertion at the glass plate.

Embodiment 7 is now described. Let one group be the battery elements of 3 layers with a manufactured accumulated error of 56 µm as mentioned above, insert an accumulated error absorption member comprised of a fibrous carbon sheet of thickness 60 µm, and laminate 3 groups alternately as shown in FIG. 6. This manufactures 9 generating elements that have the accumulated error absorption member. Afterwards, there is welding of the tab that is used to draw current for the positive electrode terminal and the negative electrode terminal, manufacturing a bipolar battery that retains using a clip through insertion at the glass plate.

Embodiment 8 is now described. Let one group be the battery elements of 3 layers with a manufactured accumulated error of 56 µm as mentioned above, insert an accumulated error absorption member comprised of a fibrous carbon sheet of thickness 60 µm, and laminate 3 groups alternately as shown in FIG. 6. This manufactures 9 generating elements that have the accumulated error absorption member. Afterwards, there is welding of the tab that is used to draw current for the positive electrode terminal and the negative electrode terminal, manufacturing a bipolar battery by vacuum sealing an aluminum laminate.

As a comparable example, let one group be the battery elements of 3 layers with a manufactured accumulated error of 56 µm as mentioned above and laminate without inserting an accumulation error absorption member to produce 9 generating elements. Afterwards, there is welding of the tab that is used to draw current for the positive electrode terminal and the negative electrode terminal, manufacturing a bipolar battery that retains using a clip through insertion at the glass plate.

Each of the bipolar batteries of Embodiments 1 to 8 was manufactured for comparison as explained above, and there was an evaluation of these bipolar batteries under the following conditions.

EXPERIMENTAL RESULTS

There was charging to a fixed current fixed voltage (CCCV) for 15 minutes up to 50.4V using a current of 10 mA for these batteries. Afterwards, there was a five second discharge at a current of 10 mA, with measurements of the electrical capacitance taken at this time, and measurements of the discharge capacity from the initial electrical capacitance. In Table 1 below, the discharge capacity of each of Embodiments 1 through 8 is shown when assuming 100% discharge capacity for the comparative example.

TABLE 1

| | Discharge capacity (comparative example = 100%) |
|---|---|
| Embodiment 1 | 123% |
| Embodiment 2 | 150% |
| Embodiment 3 | 151% |
| Embodiment 4 | 150% |
| Embodiment 5 | 158% |
| Embodiment 6 | 157% |
| Embodiment 7 | 160% |
| Embodiment 8 | 159% |

Next, there was charging to a fixed current fixed voltage (CCCV) for 15 minutes up to 50.4V using a current of 10 mA for these batteries. Afterwards, there was a five second discharge at a current of 10 mA, with measurements of the voltage taken at this time, and measurements of the resistance values from the initial decreasing voltage. In Table 2 below, the resistance values of Embodiments 1 through 8 are shown assuming a 100% resistance value for the comparative example.

TABLE 2

| | Resistance values (comparative example 100%) |
|---|---|
| Embodiment 1 | 85% |
| Embodiment 2 | 82% |
| Embodiment 3 | 83% |
| Embodiment 4 | 63% |
| Embodiment 5 | 62% |
| Embodiment 6 | 60% |
| Embodiment 7 | 50% |
| Embodiment 8 | 42% |

From the results of Table 1, the discharge capacity of each of the Embodiments 1 to 8 has a greater discharge capacity than the comparative example. This is because the battery of the comparative example, which had accumulated errors, did not maintain accurate separation between layers. It is thought that this resulted in a difficult discharge. Consequently, it is determined that battery performance is better by establishing an accumulated thickness absorption member between the battery elements.

In addition, comparing Embodiment 1 and Embodiments 2 to 8, Embodiment 1 has a somewhat reduced capacity. Consequently from these results, it is determined that it is appropriate that the thickness of the accumulated thickness absorption member be at least greater than the accumulated error.

From the results of Table 2, it is determined that the resistance values have the relationship of Embodiment 1 to 3 is greater than Embodiments 4 to 6, which are greater than Embodiment 7, which is greater than Embodiment 8. From these results, it is desirable to select material that has conductivity for the accumulated thickness absorption member and to have a fibrous carbon material that has low resistance. In Embodiments 1 through 3, there was high resistance for those materials that connected the electrodes with leads. This was because the connection surface of the lead and the electrode was limited. In contrast, for Embodiments 4 through 8, although the resistance of the accumulation thickness absorption member was large compared to the lead with surface connections, the overall resistance value compared to the lead became small because the separation was narrow. Furthermore, vacuum sealing by an aluminum laminate to raise the adhesion of every member by a pressure difference from the atmosphere outside and a vacuum for Embodiment 8 resulted in Embodiment 8 showing the lowest resistance value.

Various embodiments of the invention have been described. These and other embodiments are within the scope of the following claims.

The invention claimed is:

1. A bipolar battery comprising:
a plurality of sub battery elements; and
at least two accumulated thickness absorption members, wherein each sub battery element comprises:
a plurality of collectors that are arranged in an alternating fashion with a conductor that performs ion exchange between a positive electrode layer formed on one surface of the collector and the negative electrode layer formed on the other surface of the collector, and wherein one of the at least two accumulated thickness absorption members is arranged between adjacent sub battery elements, the accumulated thickness absorption member in contact with an outermost collector of each of the adjacent sub battery elements.

2. The bipolar battery of claim 1, wherein the collector contacting the accumulated thickness absorption member has only one of the positive electrode layer or the negative electrode layer on the opposite surface of the accumulated thickness absorption member.

3. The bipolar battery of claim 1, wherein the sub battery element further comprises a seal member that prevents the conductor from leaking between the collectors.

4. The bipolar battery of claim 3, wherein the accumulation thickness absorption member absorbs a difference in thickness of the seal members, the positive electrode layer, and the negative electrode layer proximate the accumulation thickness absorption member.

5. The bipolar battery of claim 3, wherein the accumulation thickness absorption member comprises a service area of less than the area of the collector that is located within the seal members and above the conductor in a lamination direction.

6. The bipolar battery of claim 1, wherein the accumulation thickness absorption member is formed of a conductive material.

7. The bipolar battery of claim 6, wherein the accumulation thickness absorption member is formed of a fibrous carbon material.

8. The bipolar battery of claim 1, further comprising an external member surrounding the multiple sub battery elements, wherein the internal pressure within the external member is less than an atmospheric pressure.

9. The bipolar battery of claim 8, wherein the external material is a laminate film comprising metal foil and a synthetic resin membrane.

10. The bipolar battery of claim 1, wherein the conductor is a solid type electrolyte substance.

11. The bipolar battery of claim 1, wherein the positive electrode layer comprises a lithium transition metal complex oxide substance, and wherein the negative electrode layer comprises at least one of a carbon and a lithium transition metal complex oxide substance.

12. The bipolar battery of claim 1, further comprising a motor vehicle, wherein the battery is a power source for the motor vehicle.

* * * * *